United States Patent
Su et al.

(10) Patent No.: US 11,898,099 B1
(45) Date of Patent: Feb. 13, 2024

(54) FRACTURING PROPPING AGENT AND PREPARATION METHOD OF FRACTURING PROPPING AGENT BY USING OIL SLUDGE PRODUCED IN EXPLOITED OF OIL AND GAS FIELD

(71) Applicant: Liaoning Huaye Energy Technology Service Co., Ltd., Panjin (CN)

(72) Inventors: Changming Su, Panjin (CN); Zhanqing Qu, Panjin (CN); Xinwu Zhu, Panjin (CN); Zuochen Li, Panjin (CN); Yuping Fan, Panjin (CN); Wei Liu, Panjin (CN); Wen Su, Panjin (CN); Kai Weng, Panjin (CN)

(73) Assignee: LIAONING HUAYE ENERGY TECHNOLOGY SERVICE CO., LTD., Panjin (CN)

( * ) Notice: Subject to any disclaimer, the term of this patent is extended or adjusted under 35 U.S.C. 154(b) by 0 days.

(21) Appl. No.: 17/985,422

(22) Filed: Nov. 11, 2022

(30) Foreign Application Priority Data

Aug. 23, 2022 (CN) .......................... 202211010207.8

(51) Int. Cl.
*C09K 8/80* (2006.01)
(52) U.S. Cl.
CPC ...................................... *C09K 8/80* (2013.01)
(58) Field of Classification Search
None
See application file for complete search history.

(56) References Cited

U.S. PATENT DOCUMENTS

| | | | | |
|---|---|---|---|---|
| 2003/0019640 A1* | 1/2003 | Hatcher | ................ | C09K 8/035 169/48 |
| 2013/0274153 A1* | 10/2013 | Urbanek | ................ | C09K 8/805 507/214 |
| 2022/0033307 A1* | 2/2022 | Graytee | ................ | C04B 12/04 |

* cited by examiner

*Primary Examiner* — Andrew Sue-Ako
(74) *Attorney, Agent, or Firm* — Chun-Ming Shih; LANWAY IPR SERVICES

(57) ABSTRACT

The present disclosure relates to a fracturing propping agent and a preparation method thereof. The fracturing propping agent comprises the following raw materials: dry sludge, quartz sand, coal ash, bauxite and clay. In the present disclosure, a high-quality petroleum fracturing propping agent is prepared by using dry sludge which is obtained after deoiling of oily sludge and is not subjected to high-temperature pretreatment through a silicate microcrystalline ceramic principle: the high-quality petroleum fracturing propping agent is directly prepared with the dry sludge (which is formed after the deoiling of the oily sludge produced by exploiting an oil and gas field, belonging to a hazardous waste) as a main raw material by using drying, grinding, pelletizing, re-drying, calcining and other procedures; the prepared fracturing propping agent not only can replace the function of quartz sand exploited in a natural ore deposit, but also can greatly improve the river diversion property and ultimate recovery of the modified oil layer, so as to create higher economic benefits for oil extraction enterprises. According to the present disclosure, substances from deep underground can be returned back to their exploitation locations in a form of functional materials to realize true closed loop of environmental protection and green exploitation of crude oil.

9 Claims, No Drawings

FRACTURING PROPPING AGENT AND PREPARATION METHOD OF FRACTURING PROPPING AGENT BY USING OIL SLUDGE PRODUCED IN EXPLOITED OF OIL AND GAS FIELD

TECHNICAL FIELD

The present disclosure belongs to the field of oily sludge treatment, and particularly relates to a fracturing propping agent and a preparation method of a fracturing propping agent by using oil sludge produced in exploitation of an oil and gas field.

BACKGROUND

With the continuous improvement of the exploitation degree of major oil and gas fields in China, a "2+3" oil extraction mode is more and more widely used, and the extracted crude oil contains increasing non-crude oil components such as mud, water and surfactants. In the processes of production, workover operations, crude oil stabilization and purification treatment and oil and gas pipeline leakage rescue of an oil and gas well, the total amount of the produced oily sludge has rapidly increased, and the oily sludge has been clearly listed as a hazardous solid waste by National Environmental Authority. The storage volume of such the oily sludge is increasing, causing more and more serious environmental pollution and ecological damage to oil producing areas. According to the "New Solid Waste Law", the temporary storage time of any hazardous solid waste shall not exceed one year before it is officially approved by the local government environmental competent department, and therefore various types of hazardous solid wastes must timely undergo harmless treatment or comprehensive utilization of resources. Therefore, the safe disposal and comprehensive utilization of oily sludge in major oilfields that have served for a long time in China have become key bottleneck problems for the sustainable development of oilfield production and construction. Due to the technical and cost bottlenecks in the safe disposal and resource utilization of oily sludge, the normal production and operation of these oilfields are becoming increasingly difficult.

In view of this, the technical solution of the present disclosure is proposed.

SUMMARY

In order to solve the problems existing in the prior art, the present disclosure provides a fracturing propping agent and a preparation method of a fracturing propping agent based on dry sludge formed after oily sludge in an oil field is deoiled. It is emphasized that the dry sludge of the present disclosure is formed after the oily sludge produced in exploitation of the oil and gas field is deoiled, belonging to a hazardous waste.

The solution of the present disclosure is to provide a fracturing propping agent, comprising the following raw materials in percentage by weight: 50-60% of dry sludge, 10-40% of quartz sand, 2-10% of coal ash, 2-8% of bauxite and 1-5% of clay.

Preferably, the fracturing propping agent further comprises the following raw materials in percentage by weight: 1-5% of manganese powder and 1-3% of powdered aluminum.

Preferably, the fracturing propping agent further comprises the following raw materials in percentage by weight: 1-3% of titanium dioxide and 1-2% of dolomite.

Preferably, the dry sludge has a hydrocarbon content of <0.3%.

Preferably, the bauxite has a purity of ≥65%.

Preferably, the titanium dioxide has a purity of ≥50%.

Based on the same technical conception, another solution of the present disclosure is to provide a preparation method of a fracturing propping agent, the preparation method comprising the following steps:

(1) drying dry sludge with an oil content of 0.1-0.3% after deoiling until the content of free water is 0.01-1%;

(2) mixing the dried dry sludge with remained raw materials, and grinding the obtained mixture until the residue on a 425-mesh sieve is <1%, so as to obtain mixed micro powders;

(3) pelletizing water, as a binding agent, and the mixed micro powders, to respectively prepare microspheres, and then drying the microspheres until the content of free water is 0.01-1%, so as to obtain dried microspheres; and (4) calcining the dried microspheres and performing heat maintenance to obtain a calcined material, and then crushing, grading and inspecting the calcined material to obtain the fracturing propping agent.

Preferably, the particle size range of the microsphere is one of 1180-850 μm, 1180-600 μm, 850-425 μm, 600-300 μm, 425-212 μm or 212-106 μm.

Preferably, the calcining temperature is 1050-1150° C., and the heat maintenance time is 0.5-3 h.

Where, the fracturing propping agent finished product with a particle size of 1180-850 μm (16/20 meshes) has a breakage rate of <9.0% at a closed pressure of 28 MPa, the fracturing propping agent finished product with a particle size of 1180-600 μm (16/30 meshes) has a breakage rate of <9.0% at a closed pressure of 35 MPa, the fracturing propping agent finished product with a particle size of 850-425 μm (20/40 meshes) has a breakage rate of <9.0% at a closed pressure of 52 MPa; the fracturing propping agent finished product with a particle size of 600-300 μm (30/50 meshes) has a breakage rate of <9.0% at a closed pressure of 69 MPa, and the fracturing propping agent finished product with a particle size of 425-212 μm (40/70 meshes) and 212-106 μm (70/140 meshes) has a breakage rate of <9.0% at a closed pressure of 86 MPa. The allowance value of the acid solubility of the fracturing propping agent finished product is <7.0%. Due to abnormal working conditions, 100% of wastes produced during the calcining return back to the dried sludge residues to be jointly ground to form a closed loop without solid waste discharge.

The present disclosure has the beneficial effects:

Based on a principle that vitrified ceramics can be prepared into ultrahigh-strength ultrahigh-acid/alkali-resisting ceramic particles, a high-quality petroleum fracturing propping agent is directly prepared through procedures such as drying, grinding, pelletizing, re-drying and calcining based on the dry sludge as a main raw material; in addition, the prepared fracturing propping agent can not only replace the function of quartz sand extracted from natural deposits, but also greatly improve the conductivity and ultimate recovery of the modified oil layer, so as to create higher economic benefits for oil production enterprises; in the present disclosure, the materials from deep underground re-return back to positions where they are extracted in a form of functional materials, thereby realizing the true closed loop of environmental protection and green extraction of crude oil.

DETAILED DESCRIPTION OF THE EMBODIMENTS

In order to make the purpose, technical solution and advantages of the present disclosure clearer, the technical solution of the present disclosure will be described in detail below. Obviously, the described embodiments are only some embodiments of the present disclosure but not all the embodiments. Based on the embodiments of the present disclosure, all other embodiments obtained by persons of ordinary skill in the art without creative efforts should be included within the protective scope of the present disclosure.

It should be emphasized that in actual production, the output is set according to the actual demand. In most cases, the output of each batch is different. Therefore, in the embodiments of the present disclosure, the amounts of raw materials are expressed as percentage (the percentage is fixed). When the output demand is large, it is increased according to the corresponding percentage, and when the output demand is small, it is decreased according to the corresponding percentage.

Example 1

This example provides a preparation method of a fracturing propping agent, and raw materials used are shown in Table 1.

TABLE 1

| Amounts of raw materials | |
|---|---|
| Raw materials | Amount |
| Dry sludge | 55% |
| Quartz sand | 35% |
| Coal ash | 5% |
| Bauxite | 3% |
| Clay | 2% |
| Total amount | 100% |

The preparation method comprises the following steps:
(1) dry sludge with an oil content of 0.1-0.3% after deoiling was dried until the content of free water was 0.08%;
(2) the dried dry sludge was mixed with remained raw materials, and the obtained mixture was ground by using a grinding device so that the residue on a 425-mesh sieve was <0.9%, so as to obtain mixed micro powders;
(3) water as a binding agent and the mixed micro powders were pelletized according to SY/T5108-2014 standard for petroleum fracturing propping agents, and dried until the content of free water was 0.9%, so as to obtain dried microspheres; and
(4) the dried microspheres were calcined in a rotary kiln at the calcining temperature of 1100° C., heat maintenance was performed for 1 h at a high temperature section, and then a ceramic fracturing propping agent finished product was obtained by crushing, grading and inspecting the above obtained calcining material.

Where, the fracturing propping agent finished product with a particle size of 1180-850 μm (16/20 meshes) has a breakage rate of <8.1% at a closed pressure of 28 MPa; the fracturing propping agent finished product with a particle size of 1180-600 μm (16/30 meshes) has a breakage rate of <8.5% at a closed pressure of 35 MPa; the fracturing propping agent finished product with a particle size of 850-425 μm (20/40 meshes) has a breakage rate of <8.8% at a closed pressure of 52 MPa; the fracturing propping agent finished product with a particle size of 600-300 μm (30/50 meshes) has a breakage rate of <8.6% at a closed pressure of 69 MPa; the fracturing propping agent finished product with a particle size of 425-212 μm (40/70 meshes) and 212-106 μm (70/140 meshes) has a breakage rate of <9.0% at a closed pressure of 86 MPa. The allowance value of the acid solubility of the fracturing propping agent finished product is <6.8%. During the calcining, 100% of wastes produced due to abnormal working conditions return back to the dried sludge residues to be jointly ground to form a closed loop without solid waste discharge.

Example 2

This example provides a preparation method of a fracturing propping agent, and raw materials used are shown in Table 2.

TABLE 2

| Amount of raw materials | |
|---|---|
| Raw materials | Amount |
| Dry sludge | 50% |
| Quartz sand | 40% |
| Coal ash | 2% |
| Bauxite | 2% |
| Clay | 1% |
| Manganese powder | 3% |
| Powdered aluminum | 2% |
| Total amount | 100% |

The preparation method comprises the following steps:
(1) dry sludge with an oil content of 0.1-0.3% after deoiling was dried until the content of free water was 0.07%;
(2) the dried dry sludge was mixed with remained raw materials, and the obtained mixture was ground by using a grinding device so that the residue on a 425-mesh sieve was <0.8%, so as to obtain mixed micro powders;
(3) water as a binding agent and the mixed micro powders were pelletized according to SY/T5108-2014 standard for petroleum fracturing propping agents, and dried until the content of free water was 0.85%, so as to obtain dried microspheres; and
(4) the dried microspheres were calcined in a rotary kiln at the calcining temperature of 1050° C., heat maintenance was performed for 2 h at a high temperature section, and then a ceramic fracturing propping agent finished product was obtained by crushing, grading and inspecting the above obtained calcining material.

Where, the fracturing propping agent finished product with a particle size of 1180-850 μm (16/20 meshes) has a breakage rate of <8.3% at a closed pressure of 28 MPa; the fracturing propping agent finished product with a particle size of 1180-600 μm (16/30 meshes) has a breakage rate of <8.7% at a closed pressure of 35 MPa; the fracturing propping agent finished product with a particle size of 850-425 μm (20/40 meshes) has a breakage rate of <8.9% at a closed pressure of 52 MPa; the fracturing propping agent finished product with a particle size of 600-300 μm (30/50 meshes) has a breakage rate of <8.8% at a closed pressure of 69 MPa; the fracturing propping agent finished product with a particle size of 425-212 μm (40/70 meshes) and 212-106 μm (70/140 meshes) has a breakage rate of <9.8% at a closed pressure of 86 MPa. The allowance value of the acid solubility of the fracturing propping agent finished product is <6.5%. During the calcining, 100% of wastes produced due to abnormal working conditions return back to the dried sludge residues to be jointly ground to form a closed loop without solid waste discharge.

Example 3

This example provides a preparation method of a fracturing propping agent, and raw materials used are shown in Table 3.

TABLE 3

Amount of raw materials

| Raw materials | Amount |
| --- | --- |
| Dry sludge | 60% |
| Quartz sand | 10% |
| Coal ash | 10% |
| Bauxite | 5% |
| Clay | 3% |
| Manganese powder | 5% |
| Powdered aluminum | 3% |
| Titanium dioxide | 2% |
| Dolomite | 2% |
| Total amount | 100% |

The preparation method comprises the following steps:
(1) dry sludge with an oil content of 0.1-0.3% after deoiling was dried until the content of free water was 0.07%;
(2) the dried dry sludge was mixed with remained raw materials, and the obtained mixture was ground by using a grinding device so that the residue on a 425-mesh sieve was <0.8%, so as to obtain mixed micro powders;
(3) water as a binding agent and the mixed micro powders were pelletized according to SY/T5108-2014 standard for petroleum fracturing propping agents, and dried until the content of free water was 0.85%, so as to obtain dried microspheres; and
(4) the dried microspheres were calcined in a rotary kiln at the calcining temperature of 1050° C., heat maintenance was performed for 3 h at a high temperature section, and then a ceramic fracturing propping agent finished product was obtained by crushing, grading and inspecting the above obtained calcining material.

Where, the fracturing propping agent finished product with a particle size of 1180-850 μm (16/20 meshes) has a breakage rate of <8.2% at a closed pressure of 28 MPa; the fracturing propping agent finished product with a particle size of 1180-600 μm (16/30 meshes) has a breakage rate of <8.6% at a closed pressure of 35 MPa; the fracturing propping agent finished product with a particle size of 850-425 μm (20/40 meshes) has a breakage rate of <8.8% at a closed pressure of 52 MPa; the fracturing propping agent finished product with a particle size of 600-300 μm (30/50 meshes) has a breakage rate of <8.7% at a closed pressure of 69 MPa; the fracturing propping agent finished product with a particle size of 425-212 μm (40/70 meshes) and 212-106 μm (70/140 meshes) has a breakage rate of <9.3% at a closed pressure of 86 MPa. The allowance value of the acid solubility of the fracturing propping agent finished product is <6.7%. During the calcining, 100% of wastes produced due to abnormal working conditions return back to the dried sludge residues to be jointly ground to form a closed loop without solid waste discharge.

Example 4

This example provides a preparation method of a fracturing propping agent, and raw materials used are shown in Table 4.

TABLE 4

Amount of raw materials

| Raw materials | Amount |
| --- | --- |
| Dry sludge | 54% |
| Quartz sand | 10% |
| Coal ash | 10% |
| Bauxite | 8% |
| Clay | 5% |
| Manganese powder | 5% |
| Powdered aluminum | 3% |
| Titanium dioxide | 3% |
| Dolomite | 2% |
| Total amount | 100% |

The preparation method comprises the following steps:
(1) dry sludge with an oil content of 0.1-0.3% after deoiling was dried until the content of free water was 0.08%;
(2) the dried dry sludge was mixed with remained raw materials, and the obtained mixture was ground by using a grinding device so that the residue on a 425-mesh sieve was <0.9%, so as to obtain mixed micro powders;
(3) water as a binding agent and the mixed micro powders were pelletized according to SY/T5108-2014 standard for petroleum fracturing propping agents, and dried until the content of free water was 0.9%, so as to obtain dried microspheres; and
(4) the dried microspheres were calcined in a rotary kiln at the calcining temperature of 1100° C., heat maintenance was performed for 2 h at a high temperature section, and then a ceramic fracturing propping agent finished product was obtained by crushing, grading and inspecting the above obtained calcining material.

Where, the fracturing propping agent finished product with a particle size of 1180-850 μm (16/20 meshes) has a breakage rate of <7.9% at a closed pressure of 28 MPa; the fracturing propping agent finished product with a particle size of 1180-600 μm (16/30 meshes) has a breakage rate of <8.0% at a closed pressure of 35 MPa; the fracturing propping agent finished product with a particle size of 850-425 μm (20/40 meshes) has a breakage rate of <8.5% at a closed pressure of 52 MPa; the fracturing propping agent finished product with a particle size of 600-300 μm (30/50 meshes) has a breakage rate of <8.4% at a closed pressure of 69 MPa; the fracturing propping agent finished product with a particle size of 425-212 μm (40/70 meshes) and 212-106 pin (70/140 meshes) has a breakage rate of <8.8% at a closed pressure of 86 MPa. The allowance value of the acid solubility of the fracturing propping agent finished product is <6.5%. During the calcining, 100% of wastes produced due to abnormal working conditions return back to the dried sludge residues to be jointly ground to form a closed loop without solid waste discharge.

Example 5

This example provides a preparation method of a fracturing propping agent, and raw materials used are shown in Table 5.

TABLE 5

| Amount of raw materials | |
|---|---|
| Raw materials | Amount |
| Dry sludge | 52% |
| Quartz sand | 21% |
| Coal ash | 7% |
| Bauxite | 5% |
| Clay | 3% |
| Manganese powder | 5% |
| Powdered aluminum | 3% |
| Titanium dioxide | 2% |
| Dolomite | 2% |
| Total amount | 100% |

The preparation method comprises the following steps:
(1) dry sludge with an oil content of 0.1-0.3% after deoiling was dried until the content of free water was 0.09%;
(2) the dried dry sludge was mixed with remained raw materials, and the obtained mixture was ground by using a grinding device so that the residue on a 425-mesh sieve was <0.9%, so as to obtain mixed micro powders;
(3) water as a binding agent and the mixed micro powders were pelletized according to SY/T5108-2014 standard for petroleum fracturing propping agents, and dried until the content of free water was 0.9%, so as to obtain dried microspheres; and
(4) the dried microspheres were calcined in a rotary kiln at the calcining temperature of 1150° C., heat maintenance was performed for 3 h at a high temperature section, and then a ceramic fracturing propping agent finished product was obtained by crushing, grading and inspecting the above obtained calcining material.

Where, the fracturing propping agent finished product with a particle size of 1180-850 μm (16/20 meshes) has a breakage rate of <8.0% at a closed pressure of 28 MPa; the fracturing propping agent finished product with a particle size of 1180-600 μm (16/30 meshes) has a breakage rate of <8.2% at a closed pressure of 35 MPa; the fracturing propping agent finished product with a particle size of 850-425 μm (20/40 meshes) has a breakage rate of <8.4% at a closed pressure of 52 MPa; the fracturing propping agent finished product with a particle size of 600-300 μm (30/50 meshes) has a breakage rate of <8.5% at a closed pressure of 69 MPa; the fracturing propping agent finished product with a particle size of 425-212 μm (40/70 meshes) and 212-106 μm (70/140 meshes) has a breakage rate of <8.6% at a closed pressure of 86 MPa. The allowance value of the acid solubility of the fracturing propping agent finished product is <6.5%. During the calcining, 100% of wastes produced due to abnormal working conditions return back to the dried sludge residues to be jointly ground to form a closed loop without solid waste discharge.

For indicating the properties of the fracturing propping agent, the fracturing propping agent prepared in example 5 was used as an object for detection. The detection results are shown in Table 6.

TABLE 6

| Detection results | | | | |
|---|---|---|---|---|
| Detection items | | Standard requirements | Measured value at 212-106 μm | Measured value at 425-212 μm |
| Particle size range, % | Samples that can pass the series of top sieves and remain in the upper and lower limit sieves of specifications | ≥90 | 98 | 99 |
| | Samples whose particle size is larger than the top sieve of the top sieve | ≤0.1 | 0.0 | 0.0 |
| | Sum of samples left on bottom sieve and chassis of sieve series | ≤1.0 | 0.03 | 0.02 |
| Sphericity | | ≥0.7 | 0.9 | 0.9 |
| Roundness | | ≥0.7 | 0.9 | 0.9 |
| Acid solubility, % | | ≤7.0 | 6.80 | 6.87 |
| Turbidity, FTU | | ≤100 | 36 | 42 |
| Breakage rate, % | | ≤9 | 8.2 | 7.1 |
| Volume density, g/cm$^3$ | | / | 1.36 | 1.40 |
| Apparent density, g/cm$^3$ | | / | 2.64 | 2.42 |
| Conclusion | | | Qualified | Qualified |

| Detection items | | Standard requirements | Measured value at 600-300 μm | Measured value at at 425-212 μm |
|---|---|---|---|---|
| Particle size range, % | Samples that can pass the series of top sieves and remain in the upper and lower limit sieves of specifications | ≥90 | 97 | 98 |
| | Samples whose particle size is larger than the top sieve of the top sieve | ≤0.1 | 0.0 | 0.0 |
| | Sum of samples left on bottom sieve and chassis of sieve series | ≤1.0 | 0.04 | 0.03 |
| Sphericity | | ≥0.7 | 0.9 | 0.8 |
| Roundness | | ≥0.7 | 0.9 | 0.8 |
| Acid solubility, % | | ≤7.0 | 6.73 | 6.53 |
| Turbidity, FTU | | ≤100 | 28 | 56 |
| Breakage rate, % | | ≤9 | 7.9 | 8.0 |
| Volume density, g/cm$^3$ | | / | 1.40 | 1.39 |
| Apparent density, g/cm$^3$ | | / | 2.40 | 2.39 |
| Conclusion | | | Qualified | Qualified |

The above descriptions are only specific embodiments of the present disclosure, but the protective scope of the present disclosure is not limited thereto. Those of skilled in the art, within the technical scope disclosed in the present disclosure, can easily conceive that any variations or replacements should be included within the protective scope of the present disclosure. Therefore, the protective scope of the present disclosure should be based on the protective scope of the appended claims.

What is claimed is:

1. A fracturing propping agent, comprising the following raw materials in percentage by weight: 50-60% of dry sludge, 10-40% of quartz sand, 2-10% of coal ash, 2-8% of bauxite and 1-5% of clay,
   wherein the dry sludge is formed after oily sludge from an oil field is deoiled.

2. The fracturing propping agent according to claim 1, further comprising the following raw materials in percentage by weight: 1-5% of manganese powder and 1-3% of powdered aluminum.

3. The fracturing propping agent according to claim 2, further comprising the following raw materials in percentage by weight: 1-3% of titanium dioxide and 1-2% of dolomite.

4. The fracturing propping agent according to claim 3, wherein the titanium dioxide has a purity of ≥50%.

5. The fracturing propping agent according to claim 1, wherein the dry sludge has a hydrocarbon content of <0.3%.

6. The fracturing propping agent according to claim 1, wherein the bauxite has a purity of ≥65%.

7. A preparation method of a fracturing propping agent according to claim 1, the preparation method comprising the following steps:

(1) drying dry sludge until the content of free water is 0.01-1%;

(2) mixing the dried dry sludge with the remaining raw materials to obtain a mixture, and grinding the obtained mixture until residue on a 425-mesh sieve is <1%, so as to obtain mixed micro powders;

(3) pelletizing water and the mixed micro powders, to prepare microspheres, and then drying the microspheres until the content of free water is 0.01-1%, so as to obtain dried microspheres; and (4) calcining the dried microspheres and performing heat maintenance to obtain a calcined material, and then crushing, grading and inspecting the calcined material to obtain the fracturing propping agent.

8. The preparation method of the fracturing propping agent according to claim 7, wherein the particle size range of the microsphere is one of 1180-850 μm, 1180-600 μm, 850-425 μm, 600-300 μm, 425-212 μm or 212-106 μm.

9. The preparation method of the fracturing propping agent according to claim 7, wherein the calcining temperature is 1050-1150° C., and the heat maintenance time is 0.5-3 h.

* * * * *